United States Patent [19]

Uzuki et al.

[11] 3,907,638

[45] Sept. 23, 1975

[54] SELECTIVE DEACYLATION OF N-ACYL-DL-AMINO ACIDS

[75] Inventors: Teruo Uzuki; Mayumi Takahashi, both of Kawasaki; Misa Noda, Tokyo; Yoshioki Komachiya, Yokohama; Hachiro Wakamatsu, Tokyo, all of Japan

[73] Assignee: Ajinomoto Co., Inc., Tokyo, Japan

[22] Filed: Apr. 17, 1974

[21] Appl. No.: 461,712

[30] Foreign Application Priority Data
Apr. 24, 1973  Japan.............................. 48-46472

[52] U.S. Cl.................................. 195/29; 195/2
[51] Int. Cl.² .................................... C12D 13/06
[58] Field of Search........ 195/2, 4, 27, 29, 12, 36 P, 195/66, 28 R

[56] References Cited
UNITED STATES PATENTS
3,290,225  12/1966  Rauenbusch et al. ................. 195/29
3,669,837  6/1972  Parcell ................................ 195/29

OTHER PUBLICATIONS
Greenberg, "Amino Acids and Proteins," Thomas Publishing Co., (1951), pp. 61–62, QD431 G73.

*Primary Examiner*—A. Louis Monacell
*Assistant Examiner*—R. B. Penland
*Attorney, Agent, or Firm*—Hans Berman; Kurt Kelman

[57] ABSTRACT

When N-acyl-DL-amino acids in acid aqueous solution are subjected to acylase which deacylates only one enantiomorph while the aqueous solution is in contact with an organic solvent not miscible with water, the optically active amino acid accumulates in the aqueous phase while the carboxylic acid furnishing the initial acyl group and optically active N-acyl-amino acid accumulates in the organic solvent phase. The amino acid is readily recovered from the aqueous phase, and the enzyme is available for deacylating more N-acyl-DL-amino acid without interference from the compounds transferred to the organic phase.

11 Claims, No Drawings

SELECTIVE DEACYLATION OF N-ACYL-DL-AMINO ACIDS

This invention relates to the optical resolution of amino acids, and particularly to the separation of the enantiomorphs by selective deacylation of the N-acyl derivates by acylase.

It is known that N-acyl-DL-amino acids are selectively deacylated by acylases which attack only the N-acyl derivative of one optically active form of the amino acid. The N-acyl derivative and the amino acid are sufficiently different in their properties to permit separation of the two compounds by simple methods not effective in separating the enantiomorphs of the same compound.

The known processes are costly and/or complex. The enzyme is not used economically in conventional batch processes in which it is either destroyed after each batch or contaminated with interfering compounds or diluted so as to reduce its effectiveness in a subsequent deacylation operation. These shortcomings are avoided in continuous processes in which the enzyme is held stationary relative to a moving solution of the acyl-amino acid by means of a semi-permeable ultrafiltration membrane or by being modified so as to be insoluble. However, the continuous processes are costly in materials and apparatus and present other problems which have prevented their adoption on an industrial scale.

The primary object of this invention is the provision of a method of selectively deacylating N-acyl-DL-amino acids in an aqueous medium in such a manner that the reaction products and the enzyme are recovered separately with minimal losses, and particularly to a method which is simple, inexpensive, and does not require the introduction of significant amounts of alien chemicals into the process.

It has been found that these objects can be achieved by contacting the N-acyl-DL-amino acid with acylase in an aqueous medium while the medium is in contact with an organic solvent not miscible with water, the solvent being chosen so that the concentration in the solvent of the N-acyl-DL-amino acid and of the carboxylic acid from which the initial acyl group is derived is at least equal to the concentration in the aqueous medium when solution equilibrium between the solvent and the aqueous medium is reached. It is furthermore important that the acylase be readily soluble in water. If the deacylated amino acid is only sparingly soluble in the solvent, continuous operation in a very simple manner is possible.

In the method of the invention, water, N-acyl-DL-amino acid, and acylase are stirred or otherwise held in contact with the organic solvent at a temperature and pH below 7 suitable for acylase activity until the desired, selective deacylation has taken place. It is then found that the acylase is entirely in the aqueous liquid, the optically active N-acylamino acid and the carboxylic acid formed by deacylation are in the organic solvent phase, and the desired, deacylated amino acid is in the aqueous phase as a solute or precipitates in the solid state.

Because the invention relies upon solution equilibria for separating the enzyme from the carboxylic acid, and for separating the amino acid formed from the N-acyl derivative, it is immaterial in which sequence and in which form the starting materials enter the reaction zone. The carboxylic acid formed is removed by the solvent, and the pH necessary for optimum enzyme activity in the aqueous phase is maintained virtually unchanged. It is not necessary to add alkalinizing agents during the reaction, and the problem of separating the enzyme from salts formed by neutralization does not arise. Such salts are known to interfere with enzyme activity.

If the free N-acyl-DL-amino acid is dissolved initially in the organic solvent, it diffuses into the aqueous phase in amounts sufficient to keep the deacylation reaction going although the aqueous phase has a pH value lower than 7 at which the N-acylamino acid is much more soluble in the organic phase than in the aqueous liquid, a pH of 6.5 or less being preferred for this purpose. N-Acylamino acid, when present in the aqueous phase in high concentrations, would interfere with acylase and make recovery of the desired amino acid more difficult.

If the solutes reach equilibrium in the aqueous phase and in the solvent at the start of the enzymatic reaction, and the aqueous system has the preferred pH of 3.5 to 6.5, the N-acyl-DL-amino acid is present in the aqueous phase largely as the salt of the base used for establishing the almost neutral reaction of the aqueous solution. Free N-acyl-DL-amino acid is present largely in the organic solvent. As the reaction proceeds, the free amino acid accumulates in the aqueous phase and may precipitate in crystalline form if its solubility is exceeded. The optically active N-acyl amino acid not attacked by the acylase is present predominantly in the solvent phase, and so is the carboxylic acid liberated by the acylase.

The N-acetylamino acid salt still present in the aqueous phase is generally more soluble at the preferred pH than amino acid formed in the resolution process of this invention, and it is easy to separate pure, optically active amino acid from the aqueous liquor without deactivating or otherwise damaging the acylase present and available for treatment of yet another batch of N-acyl-DL-amino acid.

The process can be made continuous by continuously or periodically withdrawing a portion of the organic solvent from the reaction zone and replacing it with solvent containing less optically active N-acylamino acid and carboxylic acid. The withdrawn solvent may be purified and returned to the process, and the optically active N-acylamino acid may be racemized and recycled. The optically active amino acid may be similarly recovered from the aqueous phase continuously or periodically, and such recovery is particularly simple when the amino acid crystallizes from the aqueous liquor. It is normally more convenient to feed N-acyl-DL-amino acid to the continuous system with the organic solvent.

The solvent may be chosen conveniently to permit the optically active N-acylamino acid to be racemized by heating while dissolved in the solvent so that the resulting solution or mixture of solvent and racemic starting material may be fed to the reaction zone without isolating the N-acetyl-DL-amino acid. The acid formed by the enzyme must be stripped at least partly from the recycled solvent since it must not accumulate in the reaction system.

If the optically active amino acid is removed from the aqueous phase in the solid state after spontaneous precipitation, the other ingredients of the aqueous phase, that is, the acylase, the base needed for setting the initial pH, and the small amount of cobalt salt needed for activating the enzyme need never be removed, and require only occasional replenishment. The method of the invention in its continuous operation thus achieves the advantages of the known method employing an enzyme fixed by an ultrafiltration membrane or by conversion to a solid adduct without the disadvantages inherent in the known processes.

The solvents employed may be chosen widely among organic liquids not miscible with water and capable of dissolving the N-acyl amino acid and the carboxylic acid originating in the acyl groups removed by the acylase. Obviously, the solvent must be inert to the enzyme and to the amino acid and its N-acyl derivative. When the solvent is intended to provide a medium for the thermal racemization of the optically active N-acylamino acid, its boiling point is to be chosen above the racemization temperature which typically is 90° to 200°C.

Solvents meeting the more restrictive conditions include the triesters of phosphoric acid having at least five, and preferably at least seven, carbon atoms in the combined alcohol moieties, such as triethyl,tripropyl, tributyl, tri-isobutyl, trichloroethyl, methyldibutyl, and methylpropylbutyl phosphate. Also suitable are the lower alkyl esters of the lower alkanoic acids, the term "lower alkyl" and its analogs relating to carbon chains of up to four members. Examples of such fatty acid esters are methyl acetate, ethyl acetate, butyl acetate and ethyl propionate, these ester solvents being chosen mainly for their ready commercial availability and low cost. Other suitable solvents include the dialkyl ketones having at least four carbon atoms, such as methyl ethyl ketone, diethyl ketone, methyl isobutyl ketone, and alcohols having at least four carbon atoms, such as n-butanol and amyl alcohol (1-pentanol).

The phosphoric acid esters are preferred because they can be handled safely through the entire processing cycle including thermal racemization of the optically active N-acylamino acid. The concentration of the N-acylamino acid in the racemization mixture is preferably higher than in the deacylation zone so that a portion of the solvent is preferably distilled off prior to heat treatment. In order to facilitate such distillation, the boiling point of the organic solvent employed should not be too high. Trialkyl phosphates having fewer than 15 carbon atoms in their combined alcohol moieties, such as tributyl and triisobutyl phosphate, and the dialkyl ketones having four to six carbon atoms have been found most advantageous among cheaply available commercial solvents in combining desirable properties.

The optimum ratio of organic solvent and aqueous medium in the reaction zone must be determined experimentally for a given set of other conditions since it is affected by the nature of the solvent, the kind of base employed for setting the pH of the aqueous phase, the nature and concentration of the N-acylamino acid in the water phase, and the like. Generally, good results are obtained with a volume of solvent which is at least 70% of the volume of the aqueous phase, and equal volumes of organic and aqueous phase may be employed initially in determining the best solvent:water ratio. This ratio, however, is not critical.

The amino acids whose N-acyl derivatives may be employed as starting materials in this method may be chosen freely among naturally occurring amino acids and synthetic amino acids never discovered in nature. The method is applicable to neutral amino acids such as alanine, valine, leucine, isoleucine, or norleucine, to hydroxyamino acids such as serine and threonine, to sulfur-bearing amino acids such as cystein, cystine, and methionine, to acidic amino acids such as aspartic and glutamic acid, to basic amino acids such as lysine, arginine, and histidine, to aromatic amino acids such as phenylalanine, tyrosine, DOPA, 3,4-methylenedihydroxy-phenylalanine, 3,4-dimethoxyphenylalanine, and phenylglycine, also to heterocyclic amino acids including tryptophan, proline, hydroxyproline, α-amino-ε-caprolactam, and 5-hydrotryptophan, this list being far from exhaustive and merely indicative of the irrelevance of the chemical structure of the amino acid.

The method is employed to particular advantage in the continuous processing of N-acyl derivatives of amino acids which are only sparingly soluble in water at pH values beneficial to acylase activity. Such amino acids include valine, leucine, isoleucine, methionine, aspartic acid, glutamic acid, phenylalanine, phenylglycine, 3,4-methylenedihydroxyphenylalanine, 3,4-diemthoxyphenylalanine, and tryptophan.

Acylase capable of splitting off acyl groups derived from substituted or unsubstituted aliphatic and aromatic carboxylic acids is known, available, and useful in decomposing corresponding N-acylamino acids in the method of this invention. The N-acyl groups having greatest practical significance in racemic, and particularly in synthetic amino acids at this time are the acetyl, formyl, chloroacetyl, propionyl, and benzoyl groups. They should be attached to all amino groups in acyl derivatives of basic amino acids to be resolved according to this invention.

The most advantageous concentration of N-acylamino acid or its salts in the aqueous phase varies somewhat with the nature of the compound, of the base employed for pH adjustment, and of the acylase. A range from 5 to 60 g/dl is usually effective, and most advantageous results are often achieved at concentrations of 10 to 40 g/dl.

The base employed for setting a desired pH in the aqueous phase, while affecting other process variable to a minor extent, is not a partner in the reaction and thus not critical. The alkali metal hydroxides, such as sodium and potassium hydroxide, calcium hydroxide, ammonium hydroxide, and organic amines are all effective, and the choice will normally be dictated by cost and availability.

All known acylases have been found to be operative if they are capable of selectively hydrolyzing either the L- or the D-form of the N-acylamino acid. Acylases found effective in the method of this invention were products of fungi, such as Aspergillus and Penicillium, of bacteria such as Achromobacter, Pseudomonas, Micrococcus, and Alkaligenes, and of the ray fungus Streptomyces. The amount of acylase needed is small, but depends on the enzyme activity of the product in an obvious manner. The acylase may amount to as little as 0.1% of the weight of the aqueous phase or to as much as 3%, but acylase of reasonable purity is usually employed in amounts of 0.5 to 1%.

The reaction temperature is chosen to suit the specific acylase employed, a temperature between 20° to 60°C being usually best, and a temperature near 35° or 40°C being beneficial to many acylases.

The following Examples are further illustrative of this invention:

EXAMPLE 1

90 g N-Acetyl-DL-phenylalanine was dissolved in 250 ml water and enough ammonium hydroxide solution to make the solution neutral. Its ultimate volume was 300 ml, and it was transferred to a two-liter reactor together with 900 ml tributyl phosphate containing 8.73 g L-phenylalanine, and 30.6 g N-acetyl-DL-phenylalanine. When equilibrium was established by stirring, the aqueous phase has a pH of 6.03. At this stage, 71.4 mg $CoCL_2 \cdot H_2O$ and 6.03 g acylase (19,000 U/g) were added and the contents of the reactor were stirred while a constant temperature of 37°C was maintained.

As the enzymatic deacylation of the N-acetyl-L-phenylalanine proceeded, crystals of L-phenylalanine precipitated. After 48 hours, the organic solvent phase was drawn off, and the L-phenylalanine crystals were filtered from the aqueous phase which was saturated with L-phenylalanine. The crystals were washed with a small amount of ice-cold water and dried. 40.43 g L-phenylalanine of 100% optical purity was recovered, corresponding to an 84.1% yield based on the entire N-acetyl-DL-phenylalanine initially present.

The organic solvent phase was found to contain 5.21 g acetic acid and 25.0 g N-acetylphenylalanine which was D-enantiomorph of 72.6% optical purity. The acetic acid and a portion of the solvent were distilled off in a vacuum, and the residue was held at about 180°C until the N-acetyl-D-phenylalanine was racemized. The resulting suspension of N-acetyl-DL-phenylalanine was recycled.

The aqueous mother liquor obtained from the crystallization of the L-enantiomorph was returned to the reactor together with 900 ml tributyl phosphate and 29.1 g N-acetyl-DL-phenylalanine. The aqueous layer had a pH of 5.97. The two-phase mixture was stirred at 37°C for 12 hours, whereupon the two liquids were separated, and 11.6 g crystalline L-phenylalanine was recovered from the aqueous phase. The procedure outlined above was repeated four times, and a total of 44.5 g crystalline L-phenylalanine was harvested.

EXAMPLE 2

120 g N-Acetyl-DL-phenylalanine was dissolved in 350 ml water and enough ammonium hydroxide solution to obtain a solution of pH 7.0. 95.2 mg Cobalt chloride was added, and the volume of the solution was adjusted with water to 400 ml. It was transferred to a flask equipped with an overflow spout, mixed with 8 g acylase (19,000 U/g), and overlaid with 1130 ml tributyl phosphate containing 40.8 g dissolved N-acetyl-DL-phenylalanine. The contents of the flask then were stirred at 37°C for 48 hours.

The organic solvent phase was poured off, and 43.6 g optically pure, crystalline L-phenylalanine was filtered from the aqueous layer, whereupon the mother liquor was returned to the flask together with the organic solvent previously poured off. While the contents of the flask were stirred at 37°C, a 1% solution of N-acetyl-DL-phenylalanine in tributyl phosphate was added to the flask at a rate of 250 ml per hour, and the organic solvent phase overflowed at the same rate. After 48 hours, the solvent phase and the aqueous liquid in the flask were separated from the precipitated crystals of L-phenylalanine which weighed 41.6 g when washed and dried.

EXAMPLE 3

90 g N-Acetyl-DL-methionine was dissolved in 250 ml water and enough ammonium hydroxide solution to make the solution neutral. It was then diluted to 300 ml, placed in a two-liter reactor, and covered with 1200 ml tributyl phosphate, and 15.61 g N-acetyl-DL-methionine was added, making the pH of the aqueous phase 5.77. Thereafter, 71.4 g. cobalt chloride and 18 g crude acylase powder (5,600 U/g) were added, and the contents of the flask were stirred at 37°C for 24 hours.

Crystallized L-methionine, an aqueous liquor, and an organic solvent phase were separated as above. The crystals weighed 22.6 g (54.85% yield). The organic liquid was stripped of acetic acid and heated to racemize the D-acetylmethionine. The aqueous liquor was returned to the reactor together with 1200 ml fresh tributyl phosphate and 15.0 g N-acetyl-DL-methionine. 5.8 g Crystalline L-methionine precipitated after four hours stirring at 37°C.

EXAMPLE 4

45 g N-Acetyl-DL-tryptophan was dissolved in 250 ml water and enough sodium hydroxide to make the solution neutral. It was then diluted to 300 ml and covered with 900 ml methylethyl ketone. 17.7 g N-Acetyl-DL-tryptophan crystals were added with stirring, and the aqueous solution was adjusted to pH 5.98 after the crystals had dissolved. Additionally, 71.4 mg cobalt chloride ($CoCl_2 \cdot 6H_2O$) and 3.14 g acylase (19,000 U/g) were added, and the mixture was stirred at 37°C for 48 hours while L-tryptophan precipitated.

The organic solvent layer was drawn off and transferred to a racemization stage as described above. 17.7 g Crystalline L-tryptophan (68.1% yield) was filtered from the aqueous liquor which was returned to the reactor together with 900 ml fresh methylethyl ketone and 16.8 g N-acetyl-DL-tryptophan. The pH of the aqueous phase was 6.0. The contents of the reactor were stirred at 37°C for 12 hours, whereupon 7.26 g L-tryptophan were recovered in crystalline form.

What is claimed is:

1. In a method of preparing an optically active amino acid from a racemic N-acyl derivative of said amino acid, the acyl group being the acyl radical of a carboxylic acid, wherein said racemic N-acyl derivative is attacked by acylase in an aqueous medium until said racemic N-acyl derivative is partly deacylated to an optically active enantiomorph of said amino acid, and an optically active enantiomorph of said N-acyl derivative and said carboxylic acid are formed, the improvement which comprises:
   a. contacting said medium during said attacking with an organic solvent not miscible with said medium,
   b. the respective equilibrium concentrations of said racemic N-acyl derivative and of said carboxylic acid in said solvent being at least equal to the corresponding concentrations in said medium, and
   c. the pH value of said medium being lower than 7.

2. In a method as set forth in claim 1, said pH value being at least 3.5.

3. In a method as set forth in claim 2, said solvent and said medium being agitated during said contacting.

4. In a method as set forth in claim 3, the volume of said solvent being at least 70% of the volume of said medium.

5. In a method as set forth in claim 4, the temperature of said medium being between 20° and 60°C, the concentration of said racemic N-acyl derivative in said aqueous medium prior to said attack being between 5 g and 60 g per deciliter.

6. In a method as set forth in claim 1, said solvent being a liquid triester of phosphoric acid, a lower alkyl ester of a lower alkanoic acid, a dialkyl ketone, or an alcohol, said triester having three alkyl groups jointly having five to 15 carbon atoms, said lower alkyl ester having one to four carbon atoms in the alcohol moiety thereof and two to four carbon atoms in the acid moiety, said dialkyl ketone and said alcohol having at least four carbon atoms and being liquid.

7. In a method as set forth in claim 1, said medium being contacted with said solvent until said optically active amino acid accumulates in said medium and said optically active enantiomorph of said N-acyl derivative and said carboxylic acid accumulates in said solvent, and separating the solvent together with the accumulated optically active enantiomorph of said N-acyl derivative and with said carboxylic acid from said optically active amino acid.

8. In a method as set forth in claim 7, heating a portion of said separated solvent and the accumulated optically active enantiomorph of said N-acyl derivative until said derivative is racemized, and thereafter contacting said portion of the separated solvent with an aqueous medium containing said acylase until said racemized derivative is deacylated by said acylase.

9. In a method as set forth in claim 8, said portion of the separated solvent and the accumulated optically active enantiomorph of said N-acyl derivative being heated at 90° to 200°C until said derivative is racemized.

10. In a method as set forth in claim 1, said amino acid being valine, leucine, isoleucine, methionine, aspartic acid, glutamic acid, phenylalanine, phenylglycine, 3,4-methylenedihydroxyphenylalanine, 3,4-dimethoxyphenylalanine, and tryptophan.

11. In a method as set forth in claim 10, the acyl moiety of said N-acyl derivative being acetyl, formyl, chloroacetyl, propionyl, or benzoyl, the volume of said solvent being at least 70% of the volume of said medium, the temperature of said medium being between 20° and 60°C, the concentration of said racemic N-acyl derivative in said aqueous medium prior to said attack being between 5 g and 60 g per deciliter, and said solvent being a liquid triester of phosphoric acid, a lower alkyl ester of a lower alkanoic acid, a dialkyl ketone, or an alcohol, said triester having three alkyl groups jointly having five to fifteen carbon atoms, said lower alkyl ester having one to four carbon atoms in the alcohol moiety thereof and two to four carbon atoms in the acid moiety, said dialkyl ketone and said alcohol having at least four carbon atoms and being liquid.

* * * * *